United States Patent [19]
Stryker

[11] 3,767,358
[45] Oct. 23, 1973

[54] RHODAMINE DYE COMPOSITION
[75] Inventor: Harvey I. Stryker, Carney's Point, N.J.
[73] Assignee: E. I. Du Pont de Nemours and Company, Wilmington, Del.
[22] Filed: Sept. 1, 1971
[21] Appl. No.: 177,173

[52] U.S. Cl. .................................. 8/25, 8/79, 8/93, 260/336
[51] Int. Cl. .............................................. C09b 1/08
[58] Field of Search .................. 260/336, 208; 8/93, 8/25

[56] References Cited
UNITED STATES PATENTS
| | | | |
|---|---|---|---|
| 516,584 | 3/1894 | Bernthsen | 260/336 |
| 2,864,908 | 7/1954 | Drautz | 8/93 UX |
| 3,049,395 | 8/1962 | Conger | 8/93 X |
| 3,503,699 | 3/1970 | Wellenreuther | 8/93 |
| 3,129,053 | 4/1964 | Castle | 8/93 |

OTHER PUBLICATIONS

Ellis, "Printing Inks," Pages 350-356, Pub. 1940 by Reinhold Publ. Corp.
Fierz–David et al., Dye Chemistry, page 21, Pub. 1949, by Interscience Publ. Inc. N.Y.C.

*Primary Examiner*—Donald Levy
*Attorney*—Francis J. Crowley

[57] ABSTRACT

A liquid Rhodamine dye composition prepared by reacting a Rhodamine Base with a dialkyl sulfate or concentrated sulfuric acid and a saturated aliphatic glycol, polyaklylene glycol, or glycol monoalkyl ether at from about 100° to 160°C.

4 Claims, No Drawings

RHODAMINE DYE COMPOSITION

BACKGROUND OF THE INVENTION

1. Field of the Invention

This invention relates to a liquid dye composition prepared by reacting a Rhodamine Base having the structure

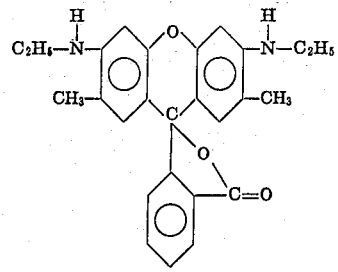

with a dialkyl sulfate or concentrated sulfuric acid and a saturated aliphatic glycol, polyalkylene glycol or glycol monoalkyl ether. This dye composition is particularly useful for dyeing cellulosic materials, e.g., paper and for preparing useful pigment toners.

2. Description of the Prior Art

The Rhodamine dyes are an art-known series of dyes, e.g., the first member of the series, Rhodamine B

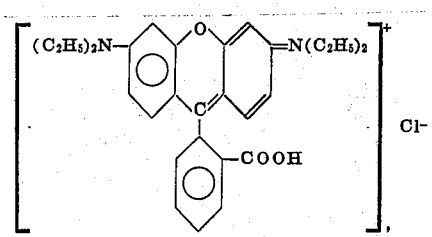

was synthesized as early as 1887.

All of the rhodamines are based structurally on Xanthene

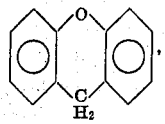

and basic, acid and chromable dyes are included in the series. As with other series of dyes, efforts have been made to provide liquid dyes of high concentration which can be used economically in continuous dyeing processes, and which also avoid the problems normally associated with the handling of dyes in dry powder form. Rhodamine B (CI 45170) is available as a solution containing an organic acid salt of the dye, water and a solvent such as acetonitrile (U.S. Pat. No. 3,346,322). Normally, as for example in the patent mentioned above, the free base of a Rhodamine dye is first isolated and then further treated to prepare the dye solution.

A novel liquid Rhodamine dye composition has now been discovered which can be effectively and economically used in continuous processes without first isolating the dye from its reaction mixture.

SUMMARY OF THE INVENTION

This invention is directed to a liquid Rhodamine dye composition prepared by a. heating from about 75 to 125 parts by weight of a dry Rhodamine Base having the structure

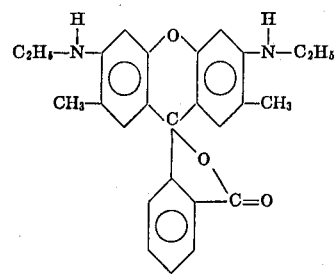

in from about 100 to 200 parts by weight of a $C_{1-4}$ saturated aliphatic glycol, $C_{2-8}$ polyalkylene glycol or $C_{1-4}$ glycol monoalkyl ether at a temperature of from about 80° to 100°C;

b. adding thereto from about 40 to 60 parts by weight of a $C_{2-4}$ dialkyl sulfate or concentrated sulfuric acid, while maintaining the temperature;

c. increasing the temperature of from about 120° to 160°C. to distill low boiling reaction products; and d. cooling the reaction mass to below about 90°C.

DESCRIPTION OF THE INVENTION

The process for making Rhodamine 6GDN CI 45160 is well known in the art. 3-Ethylamino-p-cresol is condensed with phthalic anhydride, in a solvent, if desired, to form the Rhodamine 6GDN-phthalate complex (I). The complex is broken by heating in the presence of sodium hydroxide to yield Rhodamine 6GDN Base (II). The sequence of reactions is shown below.

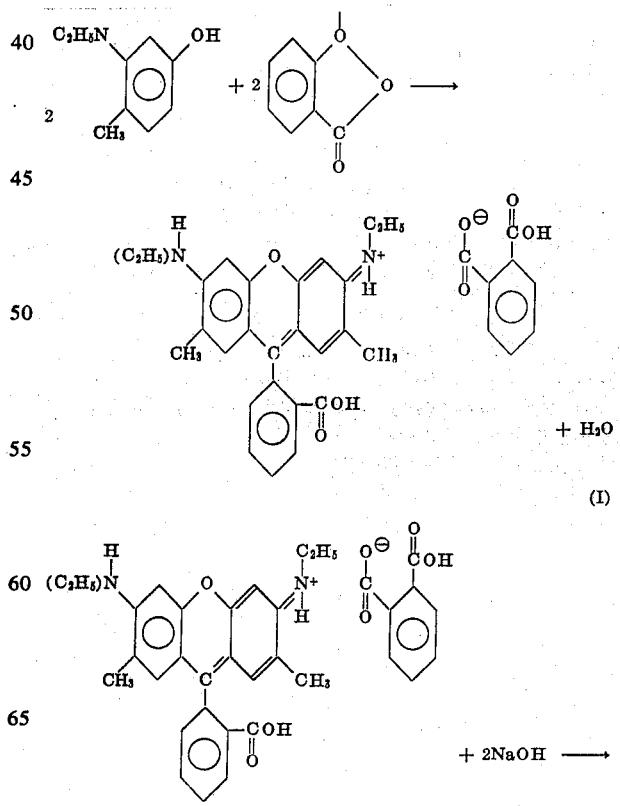

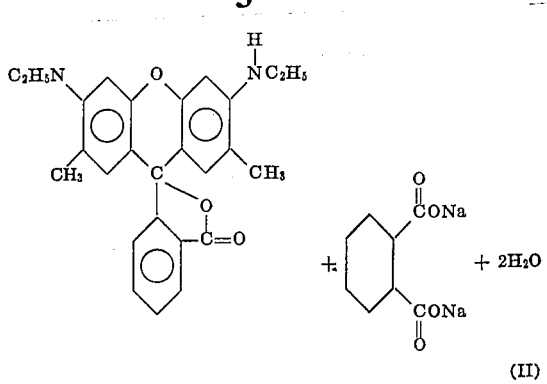

For use in this invention Rhodamine Base (II) is preferably free of water.

In preparing the composition of this invention, from about 75 to 125 parts by weight of the Rhodamine Base is heated in from about 100 to 200 parts by weight of a $C_{1-4}$ saturated aliphathic glycol, $C_{2-8}$ polyalkylene glycol or $C_{1-4}$ glycol monoalkyl ether, at a temperature of from about 80° to 100°C. From about 40 to 60 parts by weight of a $C_{2-4}$ dialkyl sulfate or concentrated sulfuric acid is gradually added thereto while maintaining the temperature at from about 80° to 100°C. Additional base may be added after addition of the sulfate or sulfuric acid. The reaction is mildly exothermic. The mass is then heated to about 120° to 160°C., allowing water and other low boiling reaction products to distill from the mass. When the insoluble base is completely converted to a water soluble product, the mass is cooled to below about 90°C. The heating step normally takes about 4 hours. After cooling, urea may be added to further promote solubility of the dye. The mass may then be diluted with water and a miscible solvent such as ethylene glycol or Cellosolve to a standard dye strength and filtered to remove any insolubles.

Use of lower reaction temperatures results in incomplete conversion of base to ester and in inferior solubility of the composition produced.

Diethyl sulfate and dimethyl sulfate are the preferred dialkyl sulfate compounds, since they are readily available and economical to use. When concentrated sulfuric acid is substituted for the dialkyl sulfate, a soluble dye composition of the same shade obtained above resulted. The yield may however be somewhat low, since some of the base may remain unconverted.

Useful glycol compounds include ethylene glycol, 1,2-propylene glycol, 1,3-propanedoil, methyl Cellosolve (ethylene glycol methyl ether), ethyl Cellosolve (ethylene glycol methyl ether), diethylene glycol, Carbitol (diethyleneglycolethylether) and polyethylene ether glycols of molecular weights up to about 200. Mixtures of any of these compounds may also be used. All of these compounds are miscible with water.

The solution product of these reactions, i.e., the composition of this invention, contains dye species of both the old alkyl ester form of the dye, and of a new form wherein the carboxylic group is esterified with a hydroxy alkyl or hydroxy alkyl ether group. The hydroxy or hydroxy ether form is believed to predominate. Although hydroxyalkyl ester forms have not been isolated, their presence has been shown by nuclear magnetic resonance spectroscopy as shown in Example 1 herein.

The soluble Rhodamine dye products of this invention, produced in this manner, are provided in commercially useful concentration without preliminary isolation of the dye. The solutions are stable at temperatures as low as 5°C. for extended periods of time. They have the same commercial uses as the available Rhodamine dyes, e.g., Rhodamine 6GDN listed in Color Index No. 45160 as Basic Red 1.

EXAMPLES

The following examples are intended to be merely illustrative of the invention and not in limitation thereof. Unless otherwise indicated, all quantities are by weight.

EXAMPLE 1

Into a suitable vessel there were charged 166 parts of ethylene glycol. After heating the glycol to about 85°C., 100 parts of dry Rhodamine 6GDN Base

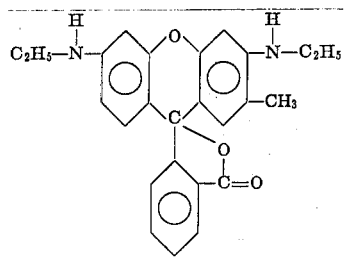

were added, with agitation. Then 50 parts of dimethyl sulfate were added gradually over about an hour, maintaining the temperature at 80° to 100°C. The charge was then heated to 140°C., distilling off low boilers, chiefly composed of water and methanol. After 4 hours at 140°C., a drop of the reaction mass was tested and found to be completely soluble in 10 ml. of water, indicating that all of the base had been converted to soluble product. The reaction mass was then cooled to below 90°C., and 30 parts of urea, 15 parts of water and 10 parts of ethylene glycol were stirred into the charge, which was then further cooled to room temperature. The charge was filtered to remove extraneous solids, yielding 320 parts of clear solution containing 100 parts of active ingredient dye and corresponding to 100 percent molecular yield from the 6GDN Base.

Conversion of a portion of the solution into pigment toner by the addition thereto of phosphomolybdic acid yields a product equivalent in quality and amount to that obtained from commercial Rhodamine 6GDN Powder (calculated on 100 percent basis).

For analytical purposes, a zinc chloride derivative of a portion of the above dye solution was prepared as follows: To 400 parts of water there were added 128 parts of the dye solution prepared above. Then were added 10 parts zinc chloride, 70 parts of concentrated (36 percent) hydrochloric acid and 50 parts of methanol. The solution was heated to 80°C., and allowed to cool without agitation. The crystals which formed were filtered off and dried, 57 parts being obtained of spectral purity 72 percent. Analysis of these crystals utilizing nuclear magnetic resonance spectroscopy indicated that the ester form present was mainly the hydroxyethyl ester, presumably derived from ethylene glycol.

I. Preparation of Pigment Toner 1,600 Grams of a 1 percent aqueous solution of the dye is prepared and heated to 180°F. Phosphomolybdic acid solution is separately prepared by dissolving 26.6 grams of $Na_2MO_4-{}_2H_2O$ and 2.0 grams of disodium phosphate heptohydrate in 1000 grams of water and heating to 180°F. To the molybdate-phosphate solution are then added 19 ml. of 37.5 percent hydrochloric acid over a 3 minute period. After stirring 15 minutes the acid complex is added to the dye solution at 180°F. over 3 minutes, and the resulting slurry stirred 10 minutes at 180°F. A spot on a piece of filter paper should have a clear run-off (no color except at center of spot). The slurry is then allowed to stir and cool for 30 minutes, when it is filtered and the solid product washed free of acid with water. The solid is dried at 170°–180°F. for 18 hours and then weighed to determine yield.

II. Drawdowns

A. Preparation of Masstone

About 0.5 gram of the above prepared toner is mixed with 1.0 gram of lithographic varnish and mulled in a glass muller (ground between two pieces of glass) until particle size is very small, and the composition is uniform in appearance. A small portion of this masstone is placed on bond paper and drawn down by pressing gently and drawing the color down over about 2 inches of the paper. The spatula is then pressed down hard and the residual color drawn down another 2 inches. A standard masstone is drawn down immediately adjacent to the test spot at the same time for comparison of shade and strength.

B. Preparation of Tint

About 0.125 gram of the above prepared masstone is mixed with 4.0 gram of previously milled zinc oxide paste by mulling over an impervious surface with a spatula. When thoroughly mixed, drawndowns are prepared in the same manner as in (A) above, and comparison made to tints from standard masstone.

The above tests determine the suitability of the prepared pigment for use in paint.

EXAMPLE 2

In a suitable vessel 100 parts of 1,3-propanediol were heated to 80° to 90°C. and 50 parts of dry Rhodamine 6GDN Base were added with agitation. Then 50 parts of dimethyl sulfate were added gradually over about 30 minutes, maintaining the temperature at 80° to 100°C. A second 50 parts of dry Rhodamine 6GDN Base were added, and the mixture heated to 140° C., allowing the vapors to distill off. After 4 hours at 140°C. the charge was cooled to below 90°C. and was diluted with 30 parts of urea, 15 parts of water and 75 parts of ethylene glycol. After cooling to 30°C. the charge was filtered to remove traces of insoluble matter. Final yield was 350 parts of color solution with an active ingredient content of 28 percent representing 100 parts of dye.

EXAMPLE 3

The procedure of Example 2 was repeated with the substitution of ethylene glycol for 1,3-propanediol and 60 parts of diethyl sulfate for the 50 parts of dimethyl sulfate used in Example 2. The yield was 335 parts of dye solution with an active ingredient content of 28 percent representing 94 parts of dye.

EXAMPLE 4

In a suitable vessel 151 parts of Rhodamine 6GDN Base wet press cake equal to 100 parts of dry base were added to 200 parts of ethylene glycol with agitation. The mixture was heated slowly to 140°C. and the distillate condensed, yielding 25 parts of water. Thus there remained 26 parts of water in the reaction mixture. After cooling to about 100°C., 50 parts of dimethyl sulfate were added dropwise over a 30 minute period. The charge was again heated to 140°C. and held at this temperature for 4 hours, then cooled and filtered. There were obtained 390 parts of color solution containing 26 percent of active ingredient representing a color yield of 100 percent.

EXAMPLE 5

In a suitable vessel 200 parts of Cellosolve (ethylene glycol monoethyl ether) were heated to 80°C. and 100 parts of dry Rhodamine 6GDN Base were added with agitation. Then 50 parts of dimethyl sulfate were added over 30 minutes. The mixture was heated at reflux under a condenser for about 5 hours, then cooled to below 90°C., and 30 parts of urea and 15 parts of water were added. After filtration there were recovered 360 parts of color solution which contained 95 parts of active ingredient dye by spectral analysis.

EXAMPLE 6

In a suitable vessel 200 parts of ethylene glycol were heated to about 80°C. and 100 parts of dry Rhodamine 6GDN Base added, with agitation. Then 50 parts of 100 percent sulfuric acid were added over 30 minutes at 80° to 100°C. The charge was heated to 140°C. and held at that temperature for 4 hours, removing the distillate. After cooling to below 90°C., 30 parts of urea and 15 parts of water were added. The charge was filtered at 30°C. yielding 415 parts of dye solution which contained 286 parts of dye.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. A liquid Rhodamine dye composition which is the reaction product solution prepared by
   a. heating from about 75 to 125 parts by weight of a dry Rhodamine Base having the structure

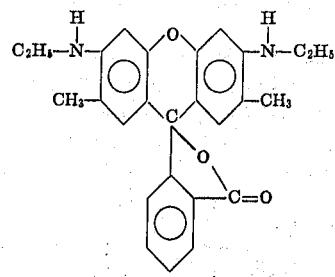

in from about 100 to 200 parts by weight of a $C_{1-4}$ saturated aliphatic glycol, $C_{2-8}$ polyalkylene glycol or $C_{1-4}$ glycol monoalkyl ether at a temperature of from about 80° to 100°C;
   b. adding thereto from about 40 to 60 parts by weight of a $C_{2-4}$ dialkyl sulfate or concentrated sulfuric acid, while maintaining the temperature;
   c. increasing the temperature of from about 120° to 160°C. to distill low boiling reaction products; and
   d. cooling the reaction mass to below about 90°C.

2. A composition prepared according to claim 1 wherein the glycol or glycol ether of (a) is selected from the group consisting of ethylene glycol, 1,2-propylene glycol, 1,3-propanediol, ethylene glycol monomethyl ether, ethylene glycol monoethyl ether, diethylene glycol, diethyleneglycolethylether, polyethylene ether gylcols having molecular weights no greater than about 200 and mixtures thereof.

3. A composition prepared according to claim 2 wherein the glycol is ethylene glycol.

4. A composition prepared according to claim 1 wherein the sulfate of (b) is dimethyl sulfate or diethyl sulfate.

* * * * *